United States Patent [19]

Kawamura et al.

[11] Patent Number: 5,233,012

[45] Date of Patent: Aug. 3, 1993

[54] PRODUCTION OF NOVEL CONDENSATES COMPRISING BISPHENOLS AND AROMATIC AMINOSULFONIC ACIDS, CONDENSATES AND DISPERSANT, ADDITIVE AND WATER-REDUCING AGENT BASED THEREON

[75] Inventors: Masanobu Kawamura; Shinji Hamada; Takashi Date, all of Iwakuni; Toshihiro Sugiwaki, Yamaguchi; Nobuhiro Hanada, Iwakuni, all of Japan

[73] Assignee: Sanyo-Kokusaku Pulp Co., Ltd., Tokyo, Japan

[21] Appl. No.: 895,133

[22] Filed: Jun. 8, 1992

Related U.S. Application Data

[62] Division of Ser. No. 566,760, Aug. 14, 1990, Pat. No. 5,153,299.

[30] Foreign Application Priority Data

| Sep. 1, 1989 | [JP] | Japan | 1-227082 |
| Oct. 26, 1989 | [JP] | Japan | 1-279229 |
| Oct. 26, 1989 | [JP] | Japan | 1-279230 |
| Dec. 27, 1989 | [JP] | Japan | 1-344656 |
| Mar. 14, 1990 | [JP] | Japan | 2-63525 |

[51] Int. Cl.$^5$ .............. C08G 14/04; C04B 24/00; C04B 7/35

[52] U.S. Cl. .............. 528/161; 528/129; 528/155; 528/162; 528/163; 106/499; 106/503; 106/725; 106/808; 106/823; 524/3; 524/4; 524/6; 524/843

[58] Field of Search .............. 528/155, 161, 129, 162, 528/163; 524/3, 4, 6, 843; 106/503, 808, 725, 499, 90, 94, 809

[56] References Cited

U.S. PATENT DOCUMENTS

| 4,936,918 | 6/1990 | Furuhashi et al. | 106/503 |
| 5,092,934 | 3/1992 | Furuhashi et al. | 524/843 |

FOREIGN PATENT DOCUMENTS

| 54-030983 | 3/1979 | Japan . |
| 59-091195 | 5/1984 | Japan . |
| 1-113419 | 5/1989 | Japan . |

*Primary Examiner*—John Kight, III
*Assistant Examiner*—Richard Jones
*Attorney, Agent, or Firm*—Oblon, Spivak, McClelland, Maier & Neustadt

[57] ABSTRACT

Novel condensates comprising bisphenols and aromatic aminosulfonic acids, in particular, novel 4-aminobenzenesulfonic acid-2,2-bis (hydroxyphenyl)propaneformaldehyde condensates, and methods for their production are disclosed. The novel condensates are useful as a dispersant for disperse dyes, an additive for carbonaceous fine powder-water slurries and as a water reducing agent for cement.

11 Claims, 4 Drawing Sheets

PRODUCTION OF NOVEL CONDENSATES COMPRISING BISPHENOLS AND AROMATIC AMINOSULFONIC ACIDS, CONDENSATES AND DISPERSANT, ADDITIVE AND WATER-REDUCING AGENT BASED THEREON

The present application is a divisional of application Ser. No. 566,760, filed Aug. 14, 1990, now U.S. Pat. No. 5,153,299.

FIELD OF THE INVENTION

The present invention relates to a production method of novel condensates of aromatic aminosulfonic acids with bisphenols, in particular, novel 4-aminobenzenesulfonic acid-2, 2-bis(4-hydroxyphenyl)propane-formaldehyde type condensate and the condensate itself. The invention is also concerned with a dispersant for disperse dye, which gives a dye dispersion excellent in high-temperature distensibility, less in contaminability and excellent in leveling property, an additive for carbonaceous fine powder-water slurry, which gives a water slurry high in viscosity-reducibility, less in fluidity change over time and excellent in transportability through pipe line, and a water-reducing agent for cement compositions such as cement paste, mortar and concrete, which has high water-reducibility, less decrease in fluidity over time and improved executability and workability, all of them being based on said condensates.

BACKGROUND OF THE INVENTION

Recently, as a water-reducing agent which improves the consistency of cement compositions and which decreases the change in fluidity such as slump loss with the lapse of time, a condensation product with high-molecular weight used aromatic aminosulfonic acids and phenols has been developed (Japanese Unexamined Patent Publication No. Hei 1-113419).

In this reaction, however, unreacted aromatic aminosulfonic acid showing no water-reducing property (dispersibility) ends up to remain in large amounts. This is considered to be due to the fact that phenols tend to make homopolymer. In addition, because of this property of phenols, the stability under acidic condition etc. cannot be said to be good.

In the invention, a condensate is provided, which has aromatic aminosulfonic acid as a component, in which unreacted aromatic aminosulfonic acid being an ineffective component is decreased to the utmost and yet which has more excellent performance and is useful in wider scope of fields over conventional aromatic aminosulfinic acid type condensate by imparting polar group, heat-resistant structure and stericity to the hydrophobic skeleton.

Next, the disperse dye has been mainly used so far for dyeing polyester fibers etc. This is made up to be dispersed stably into water by using dispersing agent, since the dye itself of disperse dye is insoluble or hard soluble into water.

As dispersing agents in such case, lignin sulfonic acid, naphthalenesulfonic acid-formaldehyde condensate, etc. have been used.

Lignin sulfonic acid is excellent in dispersibility at high temperature and exhibits good dispersibility even in a high-temperature region such as the case of dyeing polyester fibers. On the other hand, however, it tends to contaminate the cloths.

Moreover, with naphthalenesulfonic acid-formaldehyde condensate, the contaminability is low in an ordinary temperature region and it is excellent in this respect. But, it has a problem on the high-temperature dispersibility, thus the dispersibility decreases to the utmost in a high-temperature region.

Besides these lignin sulfonic acid and naphthalenesulfonic acid-formaldehyde condensate, a condensation product comprising cresol, 2-hydroxynaphthalene, sulfite and formaldehyde (Japanese Unexamined Patent Publication No. Sho 54-30983) etc. have been developed, but they are insufficient in any of high-temperature dispersibility, contaminability and leveling property.

As a result of diligent investigations on the dye dispersion which exhibits excellent dispersibility even in a high-temperature region, less contaminability and excellent leveling property, the inventors have reached the invention.

Next, accompanying with the worsening circumstances of oil supply, the coal, which is abundant in resources, lies in wide deposit areas and distributes over all parts of the world, has been reconsidered as an energy source in substitution for oil.

Moreover, the petroleum coke being a distillation residue of oil, which found little utilization hitherto as an energy source, has also become to attract attention as an important energy source.

However, the carbonaceous fine powder of coal, petroleum coke, etc. is solid material as opposed to oil making it impossible to transport by pump. For this reason, a method of pulverizing coal and petroleum coke, dispersing them into water and converting to water slurry has been put into practice.

In this case, however, the increase in the concentration of coal and petroleum coke brings about markedly increased viscosity to lose the fluidity and, inversely, the decrease in the concentration of coal and petroleum coke brings about decreased transport efficiency and also expenditure for the dehydration process, leading to impracticability.

Moreover, there is a problem in storage because of the change in produced slurry with the lapse of time, that is, early coagulation and sedimentation of carbonaceous fine powder.

As a method for raising the concentration of carbonaceous fine powder in this carbonaceous fine powder-water slurry and yet producing fluidized carbonaceous fine powder-water slurry, the addition of dispersing agent has been proposed.

For example, as a dispersing agent for coal-water slurry, naphthalenesulfonic acid-formaldehyde condensate (Japanese Unexamined Patent Publication No. Sho 62-16893) can be mentioned. As dispersing agent for petroleum coke-water slurry, polyether compound (Japanese Unexamined Patent Publication No. Sho 59-91195) etc. can be mentioned.

All of these however can hardly be said to be sufficient in viscosity-reducing property and storage stability.

Hence, a dispersing agent having high viscosity-reducing effect at lower addition level and high storage stability of slurry is still demanded.

As a result of diligent studies in detail on aromatic aminosulfonic acid type polymers, the inventors have succeeded in the development of a dispersing agent having high viscosity-reducing effect at lower addition level and yet high storage stability of carbonaceous fine powder-water slurry.

Finally, various water-reducing agents are used recently in the mortar constructions, concrete constructions, etc. aiming at the improvement in different physical properties such as improved workability, enhanced strength and durability and decreased cracking property, but high-performance AE water-reducing agent is still demanded.

So far, as the water-reducing agents for cement, salt of sulfonated melamine resin, polycarboxylate, salt of naphthalenesulfonic acid-formaldehyde high-degree condensate, lignin sulfonate, etc. have been utilized. However, with salt of sulfonated melamine resin, the water-reducing effect is low and high level of addition is required and, with polycarboxylate, the water-reducing effect is high, but increased level of addition causes a remarkable retardation of setting resulting in the deficiency of hardening as the case may be. With salt of naphthalenesulfonic acid-formaldehyde high-degree condensate, the water-reducing effect is high, the retardation of setting is low and the air-entraining property is also low, but the decrease in fluidity of mortar and concrete over time is significant. With lignin sulfonate, the water-reducing effect is high, but the air incorporation is high affecting inversely on the physical properties of mortar and concrete. These and others have been problematic points.

In recent, a concrete-admixing agent containing aromatic aminosulfonic acid-phenol-formaldehyde condensate has been developed (Japanese Unexamined Patent Publication No. Hei 1-113419). It is said that this admixing agent improves the consistency of cement composition and decreases the change in fluidity such as the slump loss with the lapse of time. With this, however, further improvements in high amount of residual monomer on condensation etc. are desired as described earlier.

As a result of diligent studies aiming at the decreased residual monomer (aromatic aminosulfonic acid) in aromatic aminosulfonic acid type admixing agent and the further improvement in fluidity of cement compositions without injuring the preventive effect on decrease in fluidity over time by imparting polar group and stericity to the hydrophobic skeleton, the inventors reached the invention.

SUMMARY OF THE INVENTION

The first of the invention is to provide a production method of novel condensates obtainable by condensing compounds represented by a general formula (I)

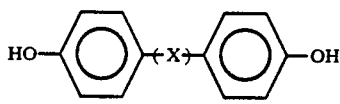

wherein X indicates any of

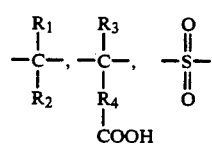

or —O—($R_1$, $R_2$ and $R_3$ indicate each independently hydrogen or alkyl group and $R_4$ indicates aklyl group)], or their salts and aromatic aminosulfonic acids represented by a general formula (II)

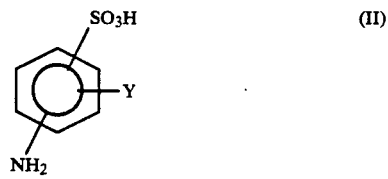

[wherein Y indicates hydrogen or alkyl group], or their salts with formaldehyde in the presence of alkali catalyst.

When the compound represented by said general formula (I) is 2, 2-bis(4-hydroxyphenyl)propane represented by a formula (I)''

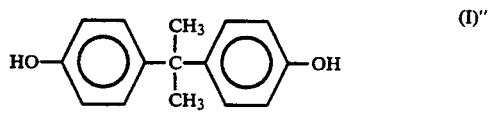

or its salts and the compound represented by the general formula (II) is 4-aminobenzenesulfonic acid represented by a formula (II)'

or its salts, the novel condensate obtainable is presumed to be 4-aminobenzenesulfonic acid-2, 2-bis(4-hydroxyphenyl) propaneformaldehyde type condensate represented by a following general formula (III).

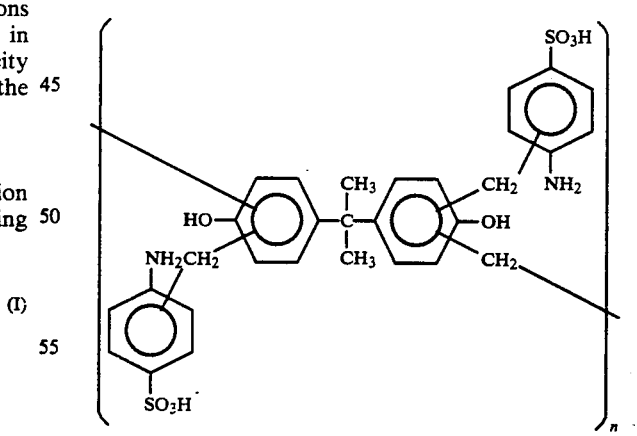

[wherein n is an integer of 1 to 20].

The dispersant for disperse dye being the second of the invention is the condensation products of compounds (I) or their salts and aromatic aminosulfonic acids (II) or their salts with formaldehyde in the presence of alkali catalyst.

Moreover, the additive for carbonaceous fine powder-water slurry and the water-reducing agent for cement being the third and the fourth of the invention, respectively, have condensates obtainable by condensing 4-aminobenzenesulfonic acid (II)' or its salts and bisphenol compounds represented by a following general formula (I)'

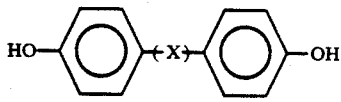

(I)' wherein X indicates

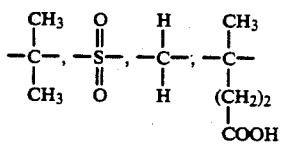

or —O—], their salts with formaldehyde as major components.

Besides, another type of water reducing agent for cement has 80 to 20 parts by weight of said condensates of 4-aminobenzenesulfonic acid (II)' or its salts and bisphenol compounds (I)'or their salts with formaldehyde and 20 to 80 parts by weight of lignin sulfonate treated the sulfite pulp spent liquor through ultrafiltration until the reducible sugars become to not more than 5% or lignin sulfonate containing not less than 0.20 mol of carboxyl group and not less than 0.10 mol of sulfonic group per phenylpropane unit as major components.

DETAILED DESCRIPTION OF THE INVENTION

Figure 1:
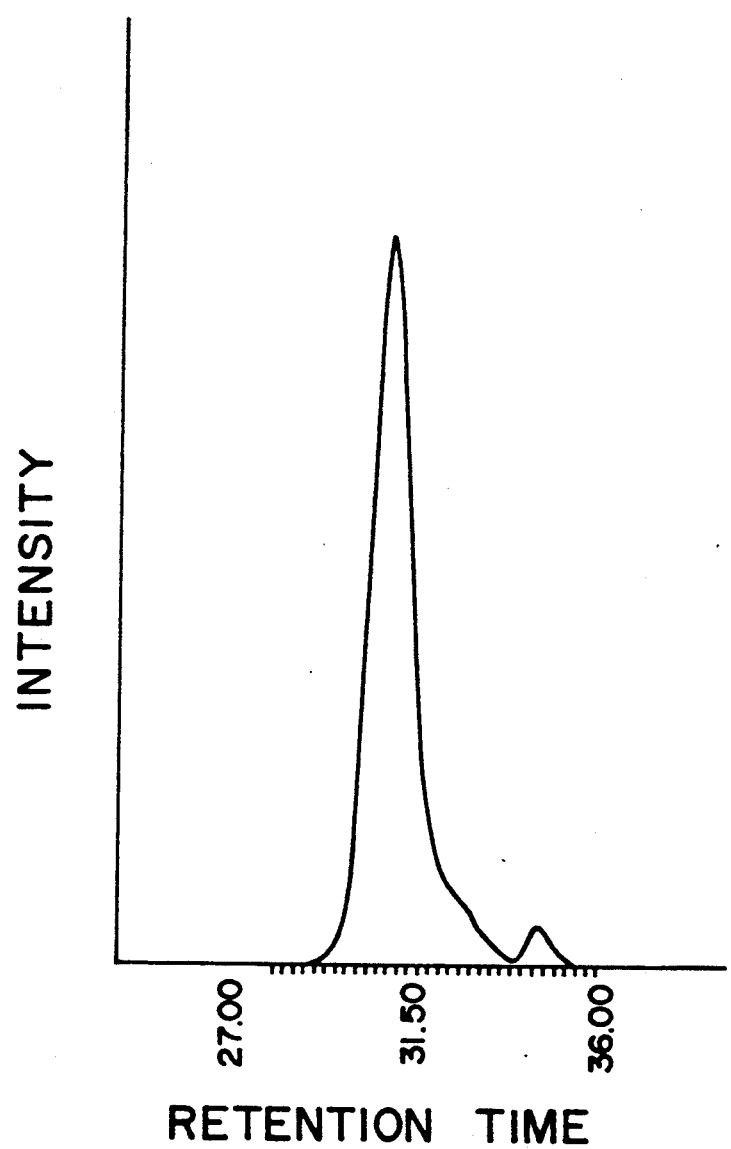
FIG. 1 shows a gel permeation chromatogram of the condensate of Example 1.
Figure 2:
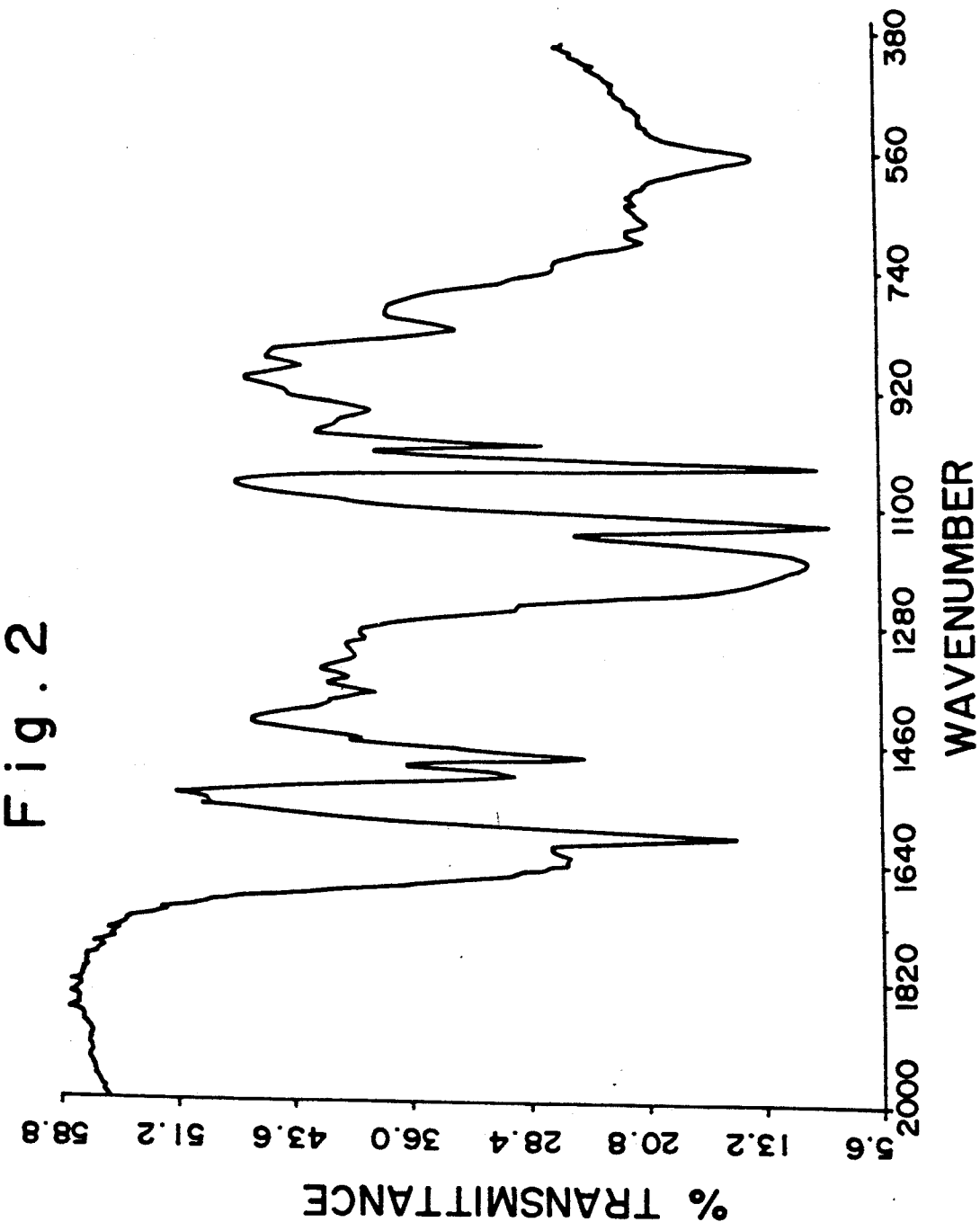
FIG. 2 and FIG. 3 show infrared spectra thereof.
Figure 3:
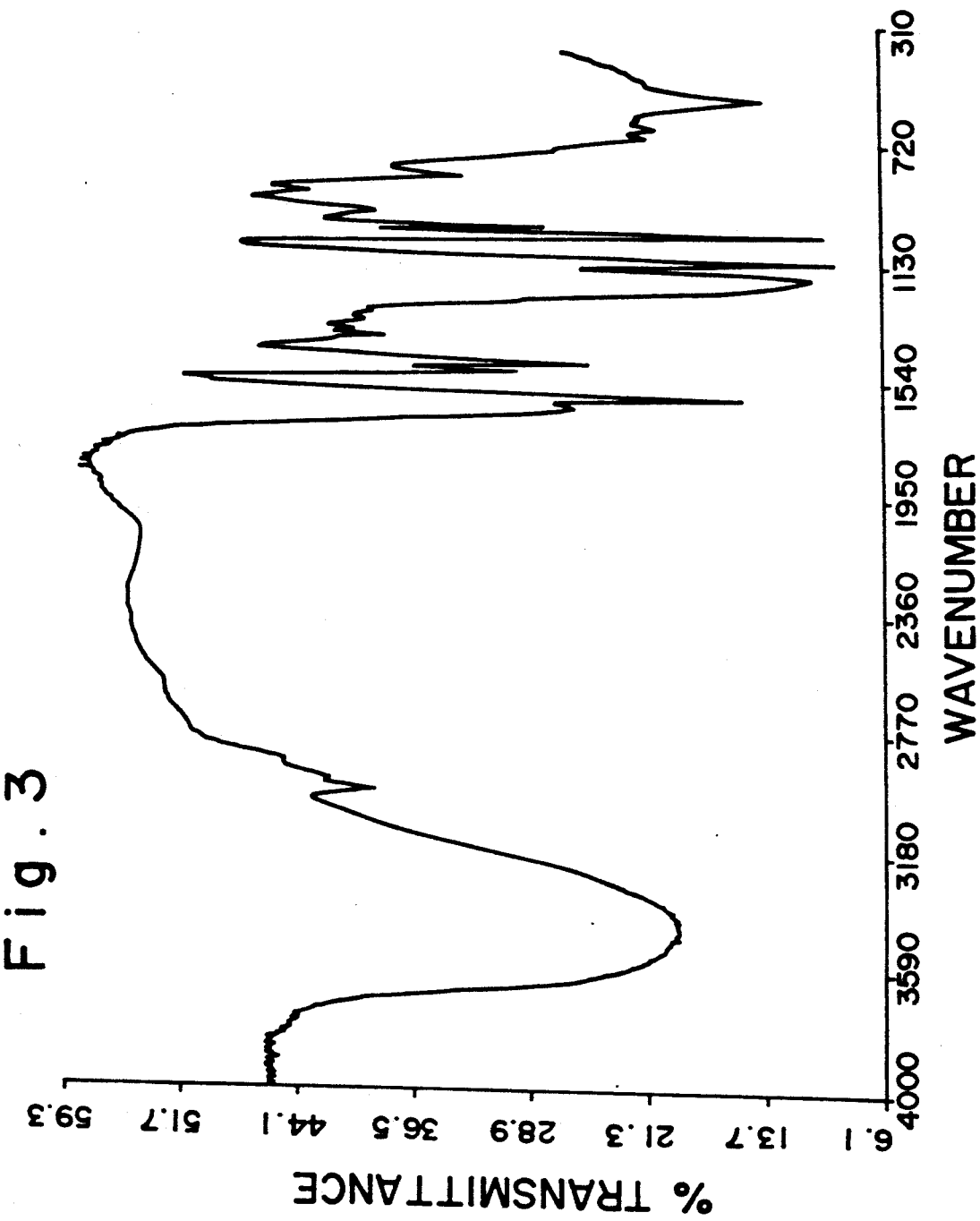

In the invention, as the compounds represented by the general formula (I), 2,2-Bis (4-hydroxyphenyl) propane (Bisphenol A):

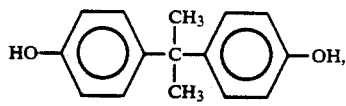

4,4'-Dihydroxydiphenylsulfone (Bisphenol S):

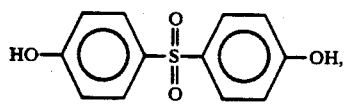

4,4'-Dihydroxydiphenylmethane (Bisphenol F):

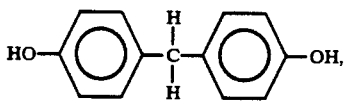

4,4-Bis (4-hydroxyphenyl) valeric acid (DPA):

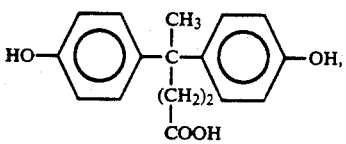

4,4-Bis (4-hydroxyphenyl) butyric acid:

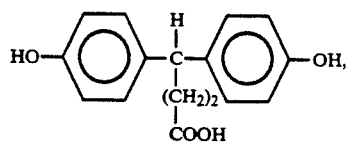

4,4'-Dihydroxydiphenyl ether (DHPE):

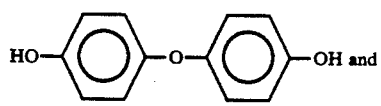

4,4'-Dihydroxybiphenyl (DHBP):

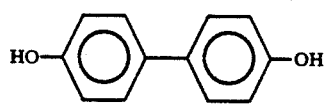

can be used preferably. It is also possible to vary the properties by combining these.

In the invention, the condensation reaction is performed at rates of 20 to 150 parts by weight of bisphenols represented by the general formula (I) or their salts and 20 to 65 parts by weight of formaldehyde to 100 parts by weight of aromatic aminosulfonic acids represented by the general formula (II) or their salts. Preferably, total molar ratio of one or not less than two kinds of compounds of general formula (I) or their salts, molar ratio of compounds of general formula (11) or their salts and molar ratio of formaldehyde are made to be 0.3–1.0:1.0:1.5–3.0. In the case of additive for carbonaceous fine powder-water slurry, however, the molar ratios of bisphenols, 4-aminobenzenesulfonic acid and formaldehyde are maintained at 0.3–0.8:1.0:1.0–3.0, respectively.

Moreover, the alkali catalysts to be used are metal oxides such as sodium hydroxide, calcium hydroxide and potassium hydroxide, hydroxide of ammonium bases, etc. It is preferable to use 0.5 to 2.0 mol equivalent of them to 1 mol of aromatic aminosulfonic acids represented by the general formula (II). In the case of water-reducing agent for cement, the addition rate of alkali is preferable to be 0.95 to 1.05 mol to 1 mol of 4-aminobenzenesulfonic acid when bisphenol compounds/4-aminobenzenesulfonic acid=1/1.

If out of these ranges of molar ratio and molar equivalent, the amount of unreacted aromatic aminosulfonic acid tends to increase. Such condensation reaction can be performed in suitable solvent not causing the condensation, but, preferably, it is performed through solid-liquid reaction by mixing bisphenols represented by the general formula (I), aromatic aminosulfonic acids represented by the general formula (II) and alkali with water. In this case, though the bisphenols represented by the general formula (I) are hard to dissolve into water (except the case of strong alkaline condition), they dissolve with the progress of reaction.

Moreover, salts of aromatic aminosulfonic acids may be dissolved into water and bisphenols are added to this to react. In this case, pH value of aqueous solution of aromatic aminosulfonates is preferable to be adjusted to 7 to 12 with alkali catalyst. If out of this range, the amount of unreacted aromatic aminosulfonic acid tends to increase.

The reaction temperature is 60° to 110° C. and the reaction time is preferably 4 to 20 hours, though not limited particularly. Moreover, if reacting again by adjusting to strong alkaline condition (pH value of 10 to 13) after the reaction for several hours, the progress of condensation would become rapid.

Furthermore, it is desirable to add formaldehyde dropwise over 1 to 3 hours and the reaction concentration is made usually to be 20 to 50 wt. %.

The condensates of the invention comprising bisphenols and aromatic aminosulfonic acids make it possible to extremely reduce the residual rate of unreacted aromatic aminosulfonic acid compared with the condensates comprising phenols and aromatic aminosulfonic acids. This is considered to be due to the difference in forming tendency of homopolymer between bisphenols and phenols. Since bisphenols show larger steric hindrance so that the freedom of reaction points is restricted significantly over phenols, they are hard to form homopolymer by themselves. Consequently, they would react almost completely with aromatic aminosulfonic acids.

In this way, it has become possible to convert almost all of aromatic aminosulfonic acids used to effective components.

Moreover, since the condensates themselves are hard to cause the re-condensation, the stability of condensates is good even under acidic condition.

Furthermore, it is possible to introduce useful polar group, hydrophilic group or heat-resistant structure into the hydrophobic skeleton. It is also possible to impart the stericity to the hydrophobic skeleton so as to make difficult to be adsorbed onto dispersed medium.

From these points, the condensates of bisphenols with aromatic aminosulfonic acids can exert their usefulness in wider scope of fields.

The dye dispersion containing the dispersants obtainable by the method of the invention has following effects.

1) It exhibits excellent dispersibility even in a high-temperature region during dyeing and causes no obstructions such as tarring and mottling.

2) It has less contamination onto polyester fibers and cotton and exhibits excellent effect even on light-color dyeing.

3) The composition of the invention is of low foaming property leading to no dyeing troubles when using for dyeing operation and uniform dyeing.

Besides, the dispersants obtainable by the method of the invention can be used together with naphthalenesulfonic acidformalhyde condensate, lignin sulfonic acid, condensation product comprising cresol, sodium salt of Schäffer's acid, sodium hydroxide and formaldehyde, and other publicly known surfactants as well as independent use thereof.

Here, with respect to the additive for carbonaceous fine powder-water slurry, some important facts should be added.

For producing the condensed compounds being the major components of additive, it is required to perform the condensation at molar ratios described above. If out of these ratios, the viscosity-reducibility, fluidity and characteristic of change over time would be decreased.

The weight-average molecular weight of condensates being the major components of additive is desirable to be 3,000 to 50,000 and, if deviating from this range, the viscosity-reducibility and storage stability would be lowered.

The particle size of carbonaceous fine powders such as cool and petroleum coke is not prescribed particularly, but it is desirable to have 200 mesh pass of not less than 50%, preferably 70 to 80%.

Moreover, in the invention, it is also possible to use the condensates together with publicly known additives such as carboxymethylcellulose, methylcellulose, polyacrylate and condensed polyphosphate. Naphthalenesulfonic acid-formaldehyde condensate and lignin sulfonate used as dispersants hitherto are similarly possible to be used together.

Also, with respect to the water-reducing agent for cement, followings should be noted.

For producing the condensates being major components of water-reducing agent, it is required to perform the condensation at specified rates described above. If out of these rates, the water-reducibility, fluidity and characteristic of change over time would be decreased. Since the effect of alkali is very significant in this condensation reaction, the addition rate of alkali is also required to be strictly retained as above. If out of the rate, the amount of residual monomer (unreacted 4-aminobenzenesulfonic acid) would become high abruptly.

The weight-average molecular weight of the condensed compounds lies in a range of 10,000 to 50,000 when determining by means of gel permeation chromatography (GPC), and, if deviating from this range, the effect for improving the fluidity would be lowered.

The lignin sulfonate treated through ultrafilzration, which is used as an another component of water-reducing agent, is one purified until the reducible sugars in sulfite pulp spent liquor become to not more than 5%. The fractionation membrane during ultrafiltration treatment is desirable to be 1,000 to 30,000, preferably 5,000 to 20,000.

Moreover, the lignin sulfonate containing not less than 0.20 mol of carboxyl group and not less than 0.10 mol of sulfonic group per phenylpropane unit can be produced by oxidizing sulfite pulp spent liquor under alkaline condition to reduce sulfonic group, as described in Japanese Patent Publication No. Sho 56-40106, or by sulfomethylating thiolignin in kraft pulp spent liquor to introduce sulfonic group.

With the condensates of bisphenol compounds and 4-aminobenzenesulfonic acid with formaldehyde alone, the fluidity over long term is not still enough and satisfied effect can be achieved for the first time by using said specified lignin sulfonate together. The rates of condensate to lignin sulfonate are 80–20:20–80 (parts by weight), and, if out of this range, the effect would be decreased remarkably.

The condensates to be used in the invention exhibit remarkable improvement effect on fluidity over the condensate of 4-aminobenzenesulfonic acid and phenol with formaldehyde (hereinafter abbreviated as A compound) described in Japanese Unexamined Patent Publication No. Hei 1-113419. This is based on following reason.

Namely, it is considered that, after the condensation reaction of A compound, about 10% of 4-aminobenzenesulfonic acid remain as residual monomer, and, in consequence of the tendency of phenol to form homopolymer, unreacted 4-aminobenzenesulfonic acid is easy to remain.

In this way, in the case of the condensation reaction of A compound using phenol, because of accompanying side-reaction and property of phenol itself, a complicated means of first process (reaction under weak alkaline condition) and second process (reaction under strong alkaline condition) is required.

Whereas, in the case of the condensates of 4-aminobenzenesulfonic acid and bisphenol compounds with formaldehyde being major components of the water-reducing agent of the invention, the residual monomer decreases to about one third compared with the case of A compound. This is considered to be due to the facts that the bisphenol compounds of the invention are hard to dissolve into water and alkali and that the formation of homopolymer being the side-reaction is hard to occur over phenol. Moreover, in the case of the invention using bisphenol compounds, there is also a feature that the complicated reaction means as the case of A compound using phenol is not required.

The water-reducing agent for cement of the invention is used in a rate of 0.01 to 2.0%, preferably 0.1 to 0.6% to cement. If the formulation level is too low, expected effects cannot be obtained and, if it is too high, the cement disperses excessively to cause separating phenomenon, leading to undesirable state.

As the cements applicable to the invention, normal portland cement, high early strength cement, ultrahigh early strength cement, blast furnace cement, moderate heat cement, fly ash cement, sulfate-resisting cement, etc. are used. Moreover, the water-reducing agent for cement of the invention can be used together with other additives for cement, for example, water-reducing agent, air-entraining agent, setting retarder, waterproofing agent, inflating agent, silica fume, stone powder, etc.

In following, the invention will be illustrated in detail based on examples.

EXAMPLE 1

Into a reactor equipped with stirring device, refluxing device, thermometer and dropping device of aqueous solution of formaldehyde, following materials were charged in fixed amounts.

| 4-Aminobenzenesulfonic acid | 173.20 g (1 mol) |
| --- | --- |
| 2, 2-Bis (4-hydroxyphenyl) propane | 114.15 g (0.5 mol) |

| Aqueous solution of NaOH | |
| --- | --- |
| 95% NaOH | 42.11 g (1 mol) |
| H$_2$O | 768.74 g |

To this solid-liquid, 171.43 g of 35% aqueous solution of formaldehyde (formaldehyde 2 mol) were added over 1 hour at a temperature of 90° C.

Then, the mixture was refluxed for 9 hours at a temperature of 100° C. to obtain an aqueous solution of condensate.

The weight-average molecular weight (Mw) and the amount of residual monomer (4-aminobenzenesulfonic acid) of the condensate thus obtained were 31,568 and 2.5% (based on solids), respectively.

Besides, the weight-average molecular weight was determined by means of gel permeation chromatography and calculated making pullulan as a standard. The residual monomer was determined from area ratio with differential refractometer of gel permeation chromatography.

A gel permeation chromatogram, infrared spectra and nuclear magnetic resonance spectrum of the condensate obtained are shown in FIG. 1, FIG. 2 and FIG. 3, and FIG. 4, respectively.

Figure 4:
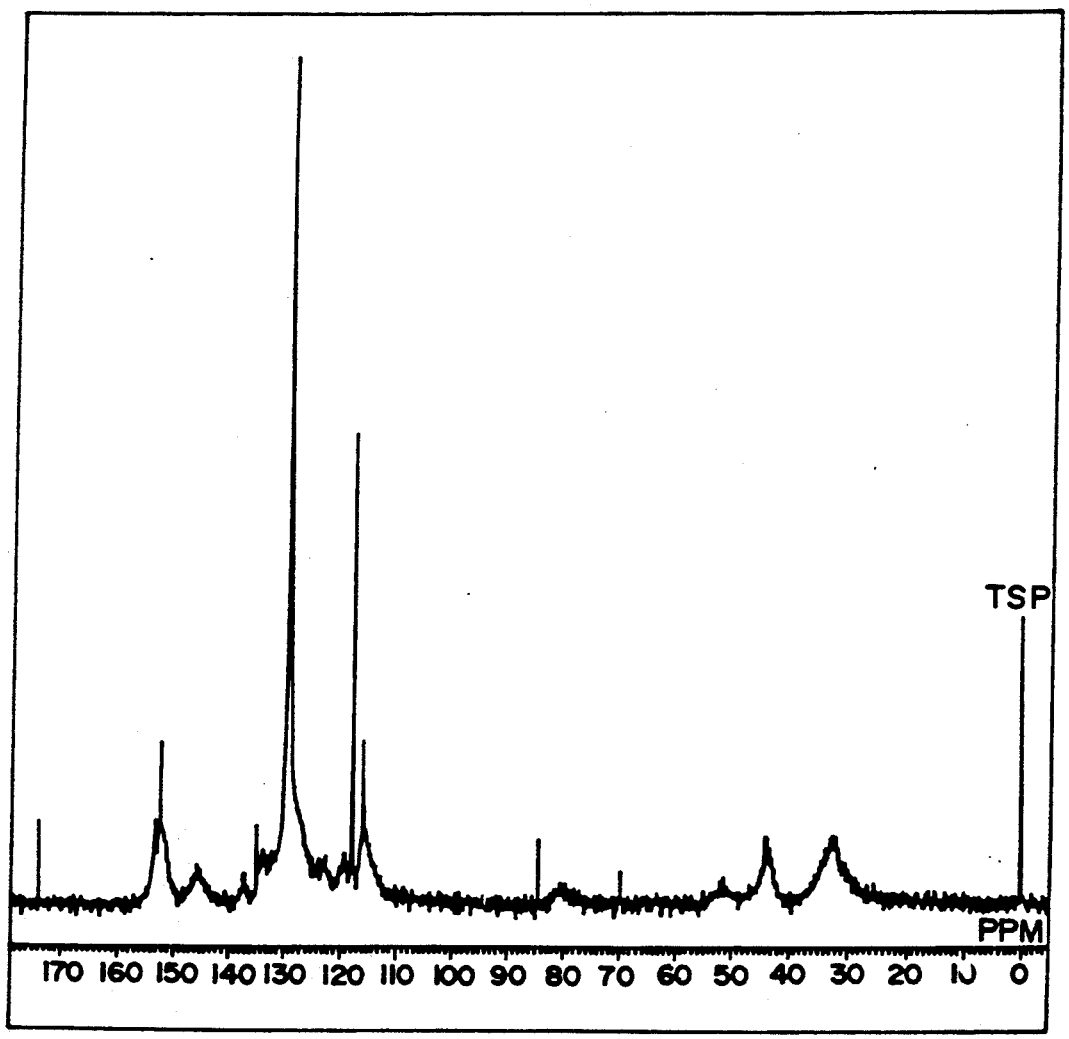
FIG. 4 shows a nuclear magnetic resonance spectrum thereof.

In FIG. 4, there are a peak at 44 ppm originating from quaternary carbon of 2, 2-bis (4-hydroxyphenyl) propane and a peak at 33 ppm originating from methyl group of 2, 2-bix (4-hydroxyphenyl) propane, thus showing a condensate of 2, 2-bis (4-hydroxyphenyl) propane.

EXAMPLE 2 THROUGH 7

Varying the bisphenol compounds, condensates were obtained similarly to Example 1.

These results are shown in Table 1.

TABLE 1

| | Reaction conditions (g/mol) | | | | | Condensate after reaction | |
| --- | --- | --- | --- | --- | --- | --- | --- |
| | 4-Aminobenzenesulfonic acid | Bisphenol compound | 95% NaOH | Water | 35% HCHO | Weight-average molecular weight | Residual 4-aminobenzenesulfonic acid (%, based on solids) |
| Example 2 | 173.20/1 | 4,4'Dihydroxy-diphenylmethane 100.12/0.5 | 42.11/1 | 736.00 | 171.43/2 | 31.290 | 3.8 |
| Example 3 | 173.20/1 | 4,4'-Dihydroxy-biphenyl 93.10/0.5 | 42.11/1 | 719.62 | 171.43/2 | 26,361 | 2.7 |
| Example 4 | 173.20/1 | 4,4'-Dihydroxy-diphenylsulfone 125.15/0.5 | 42.11/1 | 794.41 | 171.43/2 | 38,210 | 1.8 |
| Example 5 | 173.20/1 | 4,4'-Dihydroxy-diphenyl ether 101.00/0.5 | 42.11/1 | 738.06 | 171.43/2 | 26,981 | 3.1 |
| Example 6*) | 173.20/1 | 4,4-Bis(4-hydroxy-phenyl)-valeric acid 143.17/0.5 | 42.11/1 | 836.45 | 171.43/2 | 28,238 | 4.1 |
| Example 7*) | 173.20/1 | 2,2-Bis(4-hydroxy-phenyl)-propane 91.32/0.4 4,4-Bis(4-hydroxy-phenyl)-valeric acid 28.63/0.1 | 42.11/1 | 782.27 | 171.43/2 | 32.450 | 3.1 |

*)Temperatures on adding formaldehyde are 93° C. in Example 6 and 92° C. in Example 7, respectively.

EXAMPLE 8

The aqueous solutions of the condensates of Example 1 through 6 were powdered with spray dryer and the contaminability of powdered samples to cloth was tested.

Moreover, the contaminability tests with naphthalenesulfonic acid-formaldehyde low-degree condensate (hereinafter abbreviated as NSF) and partically desulfonated lignin sulfonic acid (hereinafter abbreviated as LIG) were performed concurrently using them as comparative samples.

the testing method of contaminability is as follows:

Into water, 600 mg (bone dry basis) of dispersant were dissolved. After adjusted the PH value to 5.0 with acetic acid, total volume was made to be 250 ml. This was charged into a dyeing tester together with 8 g of test cloth. After dyeing for 1 hour at 105° C., the test cloth was dried to measure the brightness.

Results obtained are shown in Table 2.

TABLE 2

|  | Brightness of cloth (%) | |
| --- | --- | --- |
|  | Cotton | Mixed-spun of tetron and cotton |
| Example 1 | 81.0 | 84.0 |
| Example 2 | 79.0 | 81.6 |
| Example 3 | 81.1 | 81.5 |
| Example 4 | 84.0 | 85.3 |
| Example 5 | 81.6 | 82.3 |
| Example 6 | 82.0 | 82.4 |
| NSF | 81.7 | 83.0 |
| LIG | 59.0 | 62.0 |

EXAMPLE 9

The high-temperature dispersibility of powdered condensates of Example 1 through 6 prepared from aqueous solutions with spray drier and NSF and LIG as comparative samples was compared.

The testing method is as follows:

Dye, dispersant and water were mixed in fixed amounts. After milled to fine particles, they were filtered and dried with spray dryer (inlet temperature: 100°-150° C., outlet temperature: 50°-55° C.).

Thereafter, the speck test and the speck test after heat treatment (80° C., 15 hours) were carried out.

Results are shown in Table 3.

TABLE 3

|  | Speck test |
| --- | --- |
| Example 1 | ○ |
| Example 2 | △ |
| Example 3 | ○ |
| Example 4 | ⊚ |
| Example 5 | ○ |
| Example 6 | ○ |
| NSF | X |

TABLE 3-continued

|  | Speck test |
| --- | --- |
| LIG | ⊚ |

EXAMPLE 10

Into a reactor, following materials were charged in fixed amounts.

| (I) 4-Aminobenzenesulfonic acid | 173.20 g (1 mol) |
| --- | --- |
| (II) 2, 2-Bis (4-hydroxyphenyl) propane | 114.15 g (0.5 mol) |
| (III) 95% NaOH | 42.11 g (1 mol) |
| Water | 768.74 g |

Next, to this solid-liquid suspension, 171.43 g (2 mol) of (IV) 35% aqueous solution of formaldehyde were added dropwise under reflux, and the reaction mixture produced was stirred for 10 hours to obtain a transparent aqueous solution of condensate.

The weight-average molecular weight (Mw) and the amount of unreacted 4-aminobenzenesulfonic acid of the condensate thus obtained were 24,950 and 2.8% (based on solids), respectivly.

EXAMPLE 11 THROUGH 15

Varying the bisphenol compounds, condensates were obtained similarly to Example 10.

Results are shown in Table 4.

TABLE 4

|  | Reaction conditions | | Condensate after reaction | |
| --- | --- | --- | --- | --- |
|  | Type of bisphenol compound | I:II:III:IV Molar ratio | Weight-average molecular weight | Residual 4-aminobenzenesulfonic acid (%, based on solids) |
| Example 11 | 4,4'-Dihydroxydiphenyl-methane | 1:0.5:1:2 | 29,865 | 3.6 |
| Example 12 | 4,4'-Dihydroxybiphenyl | 1:0.5:1:2 | 24,156 | 2.4 |
| Example 13 | 4,4'-Dihydroxydiphenyl-sulfone | 1:0.5:1:2 | 40,817 | 1.8 |
| Example 14 | 4,4'-Dihydroxydiphenyl ether | 1:0.5:1:2 | 21,287 | 3.5 |
| Example 15 | 4,4-Bis(4-Hydroxyphenyl)-valeric acid | 1:0.5:1:2 | 26,443 | 3.5 |

(I + II + III):Water = 0.3:0.7 (ratio by weight)

EXAMPLE 16 THROUGH 22

Molar ratios of (I) 4-aminobenzenesulfonic acid, (II) 2,2-bis-(4-hydroxyphenyl) propane, (III) NaOH and (IV) formaldehyde were varied as the reaction conditions to obtain the condensates similarly to Example 10.

Results are shown in Table 5.

TABLE 5

|  | Reaction conditions I:II:III:IV Molar ratio | Condensate after reaction | |
| --- | --- | --- | --- |
|  |  | Weight-average molecular weight | Residual 4-aminobenzenesulfonic acid (%, based on solids) |
| Example 10 | 1:0.5:1:2 | 24,950 | 2.8 |
| Example 16 | 1:0.5:0.98:2 | 29,387 | 1.9 |
| Example 17 | 1:0.5:1.03:2 | 13,890 | 5.0 |
| Example 18 | 1:0.4:1:1.8 | 20,050 | — |
| Example 19 | 1:0.44:1:1.88 | 20,230 | 3.4 |
| Example 20 | 1:0.6:1:2.2 | 26,420 | — |
| Example 21 | 1:0.62:1:2.24 | 27,938 | 2.1 |
| Example 22 | 1:0.75:1:2.5 | 44,281 | 1.5 |

(I + II + III):Water = 0.3:0.7 (ratio by weight)

COMPARATIVE EXAMPLE 1 THROUGH 6

In a reactor, fixed amounts of following four materials were mixed and the pH value was adjusted to 8.1 with 0.1 N aqueous solution of NaOH.

| | | |
|---|---|---|
| (I) | 4-Aminobenzenesulfonic acid | 173.20 g (1 mol) |
| (II) | Phenol | 94.10 g (1 mol) |
| (III) | 95% NaOH | 42.11 g (1 mol) |
| | Water | 721.97 g |

Nest, to this aqueous solution, 171.43 g (2 mol) of (IV) 35% aqueous solution of formaldehyde were added under reflux and the mixture was stirred for 7.5 hours under reflux (first process).

The mixture was cooled to room temperature and, after adjusted the PH value to 11.0, it was refluxed for 3 hours (second process) to obtain the condensate.

The weight-average molecular weight (Mw) and the amount of residual 4-aminobenzenesulfonic acid were 23,375 and 11.8% (based on solids), respectively.

Table 6 shows the results when varied the molar ratios of materials above.

TABLE 6

| | Reaction conditions I:II:III:IV Molar ratio | Condensate after reaction | |
|---|---|---|---|
| | | Weight-average molecular weight | Residual 4-aminobenzenesulfonic acid (%, based on solids) |
| Comparative example 1 | 1:1:1:2 | 23,375 | 11.8 |
| Comparative example 2 | 1:1:0.98:2 | 24,306 | 9.8 |
| Comparative example 3 | 1:1:1.03:2 | 33,143 | 15.0 |
| Comparative example 4 | 1:0.88:1:1.88 | 25,975 | 15.4 |
| Comparative example 5 | 1:1.24:1:2.24 | 27,294 | 10.6 |
| Comparative example 6 | 1:1.5:1:2.5 | 45,863 | 9.5 |

(I + II + III):Water = 0.3:0.7 (ratio by weight)

EXAMPLE 23

The carbonaceous fine powder-water slurry was prepared and the fluidity was measured as follows:

1. Preparation Method of Carbonaceous Fine Powder-Water Slurry

Into water dissolved beforehand a fixed amount of dispersant, carbonaceous fine powder pulverized to 200 mesh pass of 80% was thrown (total amount: 400g), which was enough wetted with a mixing rod (for pasting). Then, this was stirred for 40 minutes at 8000 rpm with TK homomixer made by Nihon Tokushu Kiko Kogyo Co. to prepare the carbonaceous fine powder-water slurry and the viscosity of slurry was measured at 20° C. by using model BL rotational viscometer. Examples and comparative examples carried out under these conditions are shown in Table 7 and Table 8. Lower viscosity indicates better fluidity.

2. Measuring Method of Fluidity of Carbonaceous Fine Powder-Water Slurry

The carbonaceous fine powder-water slurry prepared under conditions of 1) was transferred to a cylinder (inner diameter: 35 mm, height: 250 mm) and a glass rod with diameter of 6 mm and weight of 30 g was intruded to measure the dropping state with the lapse of day. If the glass rod intrudes to bottom by its own weight, the stability of slurry is good, but, if it stops at a depth of less than one half on the way and becomes not to intrude below on pushing it by hand, the stability becomes poor.

The stability of slurry was measured under these conditions and examples and comparative examples thereby measured the lasting days are shown in Table 7 and Table 8. Longer lasting days indicate better stability.

TABLE 7

(Great Greta coal)

| | Addition level (%) | Viscosity (cps) | Stability (day) |
|---|---|---|---|
| Example 10 | 0.1 | 1050 | 32 |
| Example 10 | 0.2 | 670 | 40 |
| Example 10 | 0.4 | 270 | 45 |
| Example 12 | 0.1 | 960 | 42 |
| Example 13 | 0.1 | 1020 | 35 |
| Example 18 | 0.1 | 1000 | 40 |
| Example 20 | 0.1 | 1100 | 31 |
| Comparative example 7 | 0.1 | 1950 | 5 |
| Comparative example 7 | 0.2 | 1200 | 6 |
| Comparative example 7 | 0.4 | 700 | 7 |
| Comparative example 8 | 0.1 | 2500 | 15 |
| Comparative example 8 | 0.2 | 1800 | 18 |
| Comparative example 8 | 0.4 | 1150 | 20 |

Comparative example 7: Naphthalenesulfonic acid-formaldehyde condensate
Comparative example 8: Co-condensate of modified lignin sulfonic acid treated with hydrogen peroxide after air-oxidation treatment under alkaline condition and naphthalenesulfonic acid with formaldehyde.

Comparative example 7: Naphthalenesulfonic acid-formaldehyde condensate

Comparative example 8: Co-condensate of modified lignin sulfonic acid treated with hydrogen peroxide after air-oxidation treatment under alkaline condition and naphthalenesulfonic acid with formaldehyde.

TABLE 8

(Petroleum coke, Paskagula)

| | Addition level (%) | Viscosity (cps) | Stability (day) |
|---|---|---|---|
| Example 10 | 0.1 | 1400 | 35 |
| Example 10 | 0.2 | 980 | 38 |
| Example 10 | 0.4 | 600 | 45 |
| Example 12 | 0.2 | 1000 | 39 |
| Example 13 | 0.2 | 960 | 42 |
| Example 18 | 0.2 | 1000 | 40 |
| Example 20 | 0.2 | 1040 | 35 |
| Comparative example 9 | 0.1 | 3800 | 4 |
| Comparative example 9 | 0.2 | 2200 | 5 |
| Comparative example 9 | 0.4 | 1600 | 8 |

Comparative example 9: Glycerine polyether adduct (PO/EO = 3/7), MW 30,000

EXAMPLE 24

The consistency of concrete added with the water-reducing agents of the invention was compared with that of concrete added with the reducing agents of comparative examples to compare the slump loss (change in fluidity over time) of concrete.

The formulation is as shown in Table 9.

For preparing concrete, cement, aggregates and water or water containing water-reducing agent were kneaded for 3 minutes in a 100 transportable tilting mixer and the slump was measured immediately and 30 and 60 minutes later. The slump and the amount of air were measured according to JIS.

The measurement results are as shown in Table 10. With inventive articles (examples), target slump can be obtained at lower addition level than that of conventional water-reducing agents (Comparative examples) showing that the inventive articles are excellent in the dispersibility over the conventional ones.

TABLE 9

|  | Formulation | | | | |
|---|---|---|---|---|---|
|  | W/C (%) | S/a (%) | \multicolumn{4}{c}{Unit weight* (kg/m³)} |
|  |  |  | C | W | S | G |
| Concrete added with water-reducing agent | 53.1 | 50 | 320 | 170 | 931 | 947 |

*C Cement: Normal portland cement, S.G. 3.16
W Water: Tap water
S Fine aggregates: River sand produced at Kashima, S.G. 2.59, F.M. 2.62
G Coarse aggregated: Crushed stone produced at Yamaguchi, S.G. 2.71, F.M. 6.86

TABLE 10

|  | Addition* level (%) | Amount of air (%) | Slump (cm) | | |
|---|---|---|---|---|---|
|  |  |  | Immediately | 30 min | 60 min |
| Example 10 | 0.42 | 1.5 | 19.5 | 18.5 | 18.0 |
| Example 13 | 0.40 | 1.6 | 19.5 | 19.0 | 18.5 |
| Example 14 | 0.42 | 1.6 | 20.5 | 20.0 | 19.0 |
| Example 21 | 0.42 | 1.9 | 20.0 | 19.0 | 18.5 |
| Comparative example 1 | 0.50 | 1.6 | 19.5 | 18.0 | 16.5 |
| Comparative example 5 | 0.52 | 1.7 | 20.0 | 18.0 | 17.0 |
| Comparative example 5 | 0.42 | 1.5 | 14.0 | 10.0 | 8.5 |

*% by weight based on cement

EXAMPLE 25 THROUGH 28

Specified lignin sulfonates were produced as follows:

1. The sulfite pulp spent liquor was oxidized with air under alkaline condition and allowed to precipitate with sulfuric acid. The precipitates were washed with water and neutralized with sodium hydroxide to obtain lignin sulfonate containing 0.3 mol of sulfonic group and 0.4 mol of carboxyl group per phenylpropane unit.

2. The sulfite pulp spent liquor was concentrated and purified through ultrafiltration membrane (trade name GOST (fractionatable molecular weight: 5,000) made by Bioengineering KK). The content of reducible sugars in lignin sulfonate thus obtained was 3.2% (based on solids).

The lignin sulfonates produced under 1) and 2) were mixed with the condensate produced in Example 10 at 50:50 (ratio based on solids) to obtain the inventive articles (Examples 25 and 26), respectively.

Similarly, the condensate produced in Example 13 was mixed with the lignin sulfonate produced under 1) at 60:40 (ratio based on solids) and with the lignin sulfonate produced under 2) at 40:60 (ratio based on solids) to obtain the inventive articles (Examples 27 and 28), respectively.

The materials used for concrete and the formulation are as follows:
Cement (C): Normal portland cement
Fine aggregates (S): Land sand produced at Kisarazu (S.G. 2.59, F.M. 2.40)
Coarse aggregates (G): Crushed stone produced at Yamaguchi (S.G. 2.70, F.M. 6.75)
Water (W): Tap water

TABLE 11

| Formulation | | | | | | Target slump (cm) | Target amount of air (%) |
|---|---|---|---|---|---|---|---|
| W/C (%) | S/a (%) | C | W | S | G | | |
|  |  | \multicolumn{4}{c}{(kg/m³)} | | |
| 50 | 48 | 320 | 160 | 869 | 981 | 20 | 4 |

The water-reducing agents of Example 25 through 28 were added to the formulation in Table 11, respectively and kneaded for 3 minutes in a 100 mixer. The amount of air in each slump was measured immediately and 30, 60, 90 and 120 minutes later. Besides, the measurements of slump and amount of air of concrete were made according to JIS. Moreover, similar measurement was carried out for comparison using water-reducing agents comprising the condensates obtained in Example 10, 12, 13 and 15 to obtain Comparative example 10, 12, 13 and 15.

TABLE 12

| Type of water-reducing agent | Test results of concrete | | | | | |
|---|---|---|---|---|---|---|
|  | Slump (cm) | | | | | Amount of air** (%) |
|  | Immediately | 30 min | 60 min | 90 min | 120 min | Immediately |
| Example 25 | 20.5 | 20.0 | 19.5 | 19.0 | 18.0 | 4.5 |
| Example 26 | 20.0 | 20.0 | 19.0 | 18.5 | 18.0 | 4.4 |
| Example 27 | 20.5 | 19.5 | 19.5 | 19.0 | 18.5 | 4.6 |
| Example 28 | 19.5 | 19.0 | 18.5 | 18.0 | 17.5 | 4.2 |
| Comparative example 10 | 20.5 | 19.0 | 17.5 | 15.5 | 13.0 | 4.3 |
| Comparative example 12 | 19.5 | 18.0 | 17.0 | 14.5 | 12.0 | 4.3 |
| Comparative example 13 | 19.5 | 18.5 | 17.0 | 14.0 | 11.5 | 4.7 |
| Comparative example 15 | 20.0 | 18.0 | 17.5 | 16.0 | 12.5 | 4.6 |

*Addition level of water-reducing agent: 0.5% based on cement
**Adjusted with surfactant The measurement results are as in Table 12, which show better retainment in fluidity of the inventive articles over comparative ones.

As described above, the condensates of the invention are useful as industrial dispersants and epoxy resin hardeners.

When using them as water-reducing agents for cement compositions such as cement paste, mortar and concrete in accordance with the invention, the water-reducing property is particularly high, the expected fluidity can be achieved at lower addition level over conventional cement admixing agents and the decrease in fluidity over time is low to improve the executability and workability.

Moreover, when using as dye dispersants, they exhibit excellent dispersibility even in a high-temperature region, excellent leveling property and low contaminability.

Furthermore, they show high viscosity-reducing effect at lower addition level over conventional additives for carbonaceous fine powder-water slurry and stability. They have also excellent dispersibility for gypsum, calcium carbonate, etc.

What is claimed is:

1. A water-reducing agent for cement, comprising a condensate prepared by reacting a bisphenol compound of the formula (I)

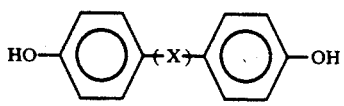 (I)

wherein X indicates a member selected from the group consisting of a covalent bond,

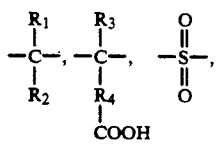

—O—and mixtures thereof, $R_1$, $R_2$ and $R_3$ each independently is hydrogen or alkyl and $R_4$ is alkylene, or salts thereof, with a compound having the formula (II)

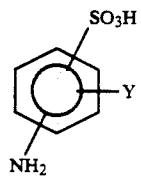 (II)

wherein Y is hydrogen or alkyl, or salts thereof, and with formaldehyde in the presence of an alkali catalyst at a pH of from 7 to 12, wherein said bisphenol is present in an amount of from 20 to 150 parts by weight and said formaldehyde is present in an amount of from 20 to 65 parts by weight, relative to 100 parts by weight of said aromatic aminosulfonic acid, and said condensate has a weight-average molecular weight of from 10,000 to 50,000.

2. The water-reducing agent of claim 1, wherein $R_1$, $R_2$ and $R_3$ each independently is hydrogen or methyl, $R_4$ is $(CH_2)_2$ and Y is hydrogen.

3. The water-reducing agent of claim 1, wherein said reacting is conducted by adding said formaldehyde to a mixture of said bisphenol compound, said aromatic aminosulfonic acid compound and said alkali catalyst, then heating said formaldehyde and said mixture at a temperature of from 60° to 110° C. over a period of time of from 4 to 20 hours.

4. The water-reducing agent of claim 3, wherein said formaldehyde is added to said mixture of said bisphenol compound, said aromatic aminosulfonic acid compound and said alkali catalyst dropwise over a period of time of from ob 1 to 3 hours.

5. The water-reducing agent of claim 1, wherein said bisphenol compound having the formula (I) is selected from the group consisting of 2,2-bis(4-hydroxyphenyl)-propane, 4,4'-dihydroxydiphenylsulfone, 4,4'-dihydroxydiphenylmethane, 4,4-bis(4-hydroxyphenyl)valeric acid, 4,4-bis (4-hydroxyphenyl)-butyric acid, 4,4'-dihydroxydiphenylether and 4,4'-dihydroxybiphenyl.

6. The water-reducing agent of claim 3, wherein said alkali catalyst is selected from the group consisting of sodium hydroxide, calcium hydroxide, potassium hydroxide and ammonium hydroxide.

7. The water-reducing agent of claim 1, comprising from 80 to 20 parts by weight of said condensate, and further comprising form 20 to 80 parts by weight of a lignin sulfonate obtained from a sulfite pulp spent liquor which is treated by ultrafiltration until the content of reducible sugars is not more than 5%, said lignin sulfonate having not less than 0.2 mol of carboxyl groups and not less than 0.10 mol of sulfonate groups per mol of phenylpropane units.

8. The water-reducing agent of claim 7, wherein said ultrafiltration has a fractionation membrane for a molecular weight of from 1,000 to 30,000.

9. The water-reducing agent of claim 1, having the formula (III):

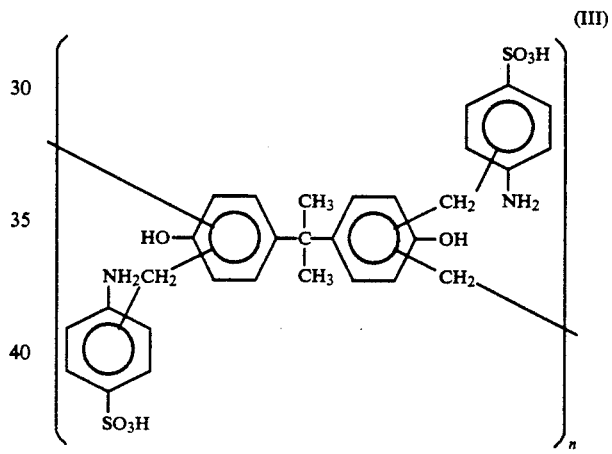

wherein n is an integer of 1 to 20.

10. The water-reducing agent of claim 4, wherein said alkali catalyst is present in from 0.5 to 2.0 mol equivalents with respect to 1 mol of said aromatic aminosulfonic acid compound.

11. The water-reducing agent of claim 10, wherein said aromatic aminosulfonic acid compound is 4-aminobenzenesulfonic acid, said aromatic aminosulfonic acid compound and said bisphenol are present in a ratio of 1/1, and said alkali catalyst is added at a rate maintaining from 0.95 to 1.05 mol equivalents with respect to 1 mol of said aromatic aminosulfonic acid compound.

* * * * *